US012798223B2

(12) United States Patent
Wölfel

(10) Patent No.: US 12,798,223 B2
(45) Date of Patent: Nov. 17, 2026

(54) PROFILE SYSTEM

(71) Applicant: REHAU INDUSTRIES SE & CO. KG, Rehau (DE)

(72) Inventor: Michael Wölfel, Dohlau OT Tauperlitz (DE)

(73) Assignee: REHAU INDUSTRIES SE & CO. KG, Rehau (DE)

( * ) Notice: Subject to any disclaimer, the term of this patent is extended or adjusted under 35 U.S.C. 154(b) by 174 days.

(21) Appl. No.: 18/851,012

(22) PCT Filed: Mar. 27, 2023

(86) PCT No.: PCT/EP2023/057786

§ 371 (c)(1),
(2) Date: Sep. 25, 2024

(87) PCT Pub. No.: WO2023/194136

PCT Pub. Date: Oct. 12, 2023

(65) Prior Publication Data

US 2025/0206003 A1 Jun. 26, 2025

(30) Foreign Application Priority Data

Apr. 8, 2022 (DE) ..................... 20 2022 101 908.8
Nov. 17, 2022 (DE) ..................... 20 2022 106 443.1

(51) Int. Cl.
*B32B 27/08* (2006.01)
*B32B 27/20* (2006.01)
*B32B 27/30* (2006.01)
*B32B 33/00* (2006.01)

(52) U.S. Cl.
CPC .............. *B32B 27/08* (2013.01); *B32B 27/20* (2013.01); *B32B 27/308* (2013.01); *B32B 33/00* (2013.01); *B32B 2264/04* (2013.01); *B32B 2264/1026* (2020.08); *B32B 2264/12* (2013.01); *B32B 2264/303* (2020.08); *B32B 2307/412* (2013.01); *B32B 2307/7376* (2023.05)

(58) Field of Classification Search
None
See application file for complete search history.

(56) References Cited

U.S. PATENT DOCUMENTS 4,851,458 A 7/1989 Hopperdietzel

FOREIGN PATENT DOCUMENTS

| | | | |
|---|---|---|---|
| DE | 3630937 | A1 | 3/1988 |
| DE | 4208991 | A1 | 9/1993 |
| DE | 102007022074 | A1 | 11/2008 |
| DE | 102012008401 | A1 | 10/2013 |
| DE | 202015102073 | U1 | 7/2015 |
| DE | 202014106167 | U1 | 5/2016 |
| DE | 202018101329 | U1 | 4/2018 |
| DE | 102020108599 | A1 | 9/2021 |
| DE | 202020106104 | U1 | 3/2022 |
| EP | 2021414 | B1 | 11/2007 |
| EP | 3950868 | A1 | 2/2022 |
| EP | 4122676 | A1 | 1/2023 |
| WO | 0240576 | A1 | 5/2002 |

OTHER PUBLICATIONS

German Search Report issued in connection with corresponding German application No. DE 20 2022 101 908.8 dated Sep. 24, 2022.

*Primary Examiner* — Sheeba Ahmed
(74) *Attorney, Agent, or Firm* — Aird & Berlis LLP

(57) ABSTRACT

The invention relates to a profile system, in particular an edge strip, having at least one strip core formed from at least one polymer material, the strip core having a front side and a rear side arranged opposite the front side, the polymer material of the strip core comprising at least 0.5 to 15 wt. %, preferably 1 to 10 wt. %, particularly preferably 1 to 5 wt. %, relative to the total weight, of fillers comprising cellulose, mica, glitter and mixtures thereof, with an average particle size of approximately 100 to 1,600 μm, preferably 120 to 1,000 μm, particularly preferably 150 to 500 μm according to ISO 13320:2020-0, the polymer material of the strip core comprising at least 0.1 to 10 wt. %, preferably 0.1 to 5 wt. %, particularly preferably 0.1 to 2.5 wt. %, in relation to the total weight, of organic fillers and/or inorganic fillers.

19 Claims, 2 Drawing Sheets

PROFILE SYSTEM

Figure 1:
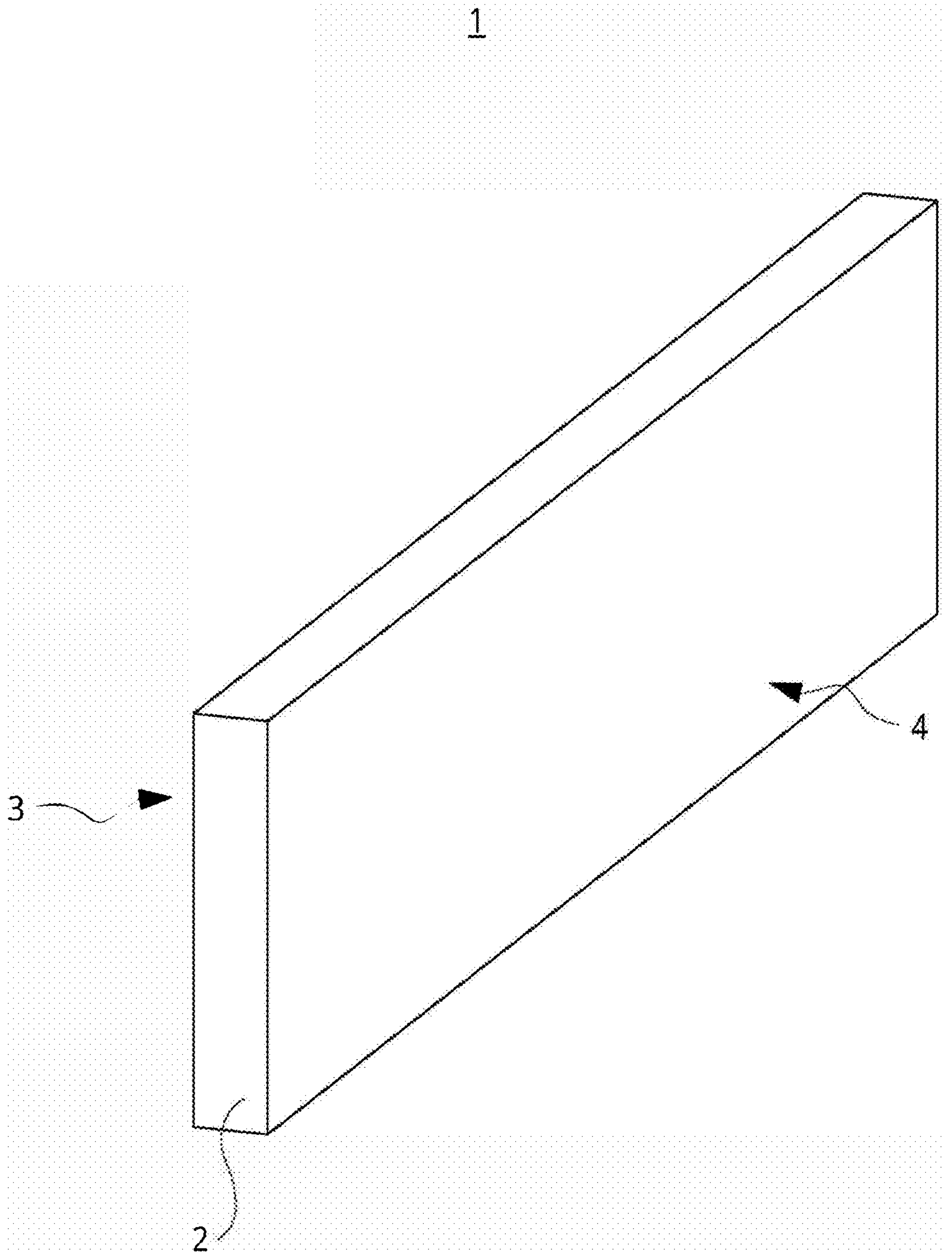

The invention relates to a profile system, in particular an edge strip, having at least one strip core formed from at least one polymer material, the strip core having a front side and a rear side arranged opposite the front side, and to an object comprising at least one such profile system.

Until now, such profile systems have preferably been used to decorate the narrow sides/side edges of objects, such as furniture panels or wood-based panels, particle boards, but increasingly also doors, walls, ceilings, floors, banisters, handrails and the like. For this purpose, the profile systems are fixed to the narrow sides/side edges of the objects to be decorated, for example. By selecting a special material, these profile systems can be adapted so that a desired look can be achieved, e.g. with regard to the corresponding furniture part edge.

However, the visual impression that can be achieved with the previous profile systems cannot always satisfy the constantly increasing demands on the appearance of modern objects such as pieces of furniture, especially when new functions/designs/surfaces are required for the profile systems.

It was therefore necessary to optimise/modify the materials previously used in such a way that new functionalities/designs/surfaces could be realised.

The invention therefore addresses the problem of overcoming the disadvantages of the prior art and providing profile systems which, on the one hand, make it possible to achieve a high-quality visual impression and retain the previous functions from the prior art and which, on the other hand, include new functionalities and at the same time can be produced economically and cost-effectively.

According to the invention, this problem is solved by the features of claim 1. Further advantageous embodiments are described in the dependent claims.

It has surprisingly been found that a profile system, in particular an edge strip, with at least one strip core formed from at least one polymer material, the strip core having a front side and a rear side arranged opposite the front side, wherein

- the polymer material of the strip core comprises at least 0.5 to 15 wt. %, preferably 1 to 10 wt. %, particularly preferably 1 to 5 wt. %, relative to the total weight, of fillers comprising cellulose, mica, glitter and mixtures thereof,
- with an average particle size of approximately 100 to 1,600 μm, preferably 120 to 1,000 μm, particularly preferably 150 to 500 μm according to ISO 13320:2020-0, and
- the polymer material of the strip core comprises at least 0.1 to 10 wt. %, preferably 0.1 to 5 wt. %, particularly preferably 0.1 to 2.5 wt. %, relative to the total weight, of inorganic fillers and/or organic fillers, solves this problem.

In this way, it is advantageously feasible to provide a profile system that not only realises the previously known functional effects, for example against moisture or temperatures, but that this profile system is able to exhibit a visually new, optically perceptible structural effect when used as intended, which creates a completely new panel appearance, especially in the case of a profile system attached to a furniture panel and adapted/milled on the longitudinal sides. Surprisingly, a visual transition between the furniture panel and the profile system attached to the end face is no longer recognisable. The profile system is therefore very versatile and can be attached to various objects such as furniture panels, pieces of furniture, doors, particle boards, worktops and the like and, in addition to the function of protecting a narrow side/end face of a furniture panel, for example, improved visual or design aspects can also be realised.

An advantage of the profile system is that the inorganic fillers are in particle form and/or spherulitic and/or fibrous and/or in flake form and/or rod-shaped, selected from the group of elements: C, Si, Al, Ca, Ti, Fe, Zn, Sn, as well as mixtures thereof. As a result, the profile system can be produced economically and cost-effectively and can be optimally adapted to objects such as furniture panels, pieces of furniture, particle boards, doors, worktops and the like in terms of appearance, feel and structural effects.

A further advantage of the profile system is that the organic fillers are in particle form and/or spherulitic and/or fibrous and/or flake form and/or are rod-shaped, selected from the group of elements C, O, H. These advantageous features also make it possible to provide profile systems which can be produced economically and cost-effectively and which can be designed in a variety of ways with regard to their visual and design properties.

Another advantage of the profile system is that pigments selected from inorganic pigments such as titanium dioxide, zinc oxide, iron oxide black, spinel black, red pigments, yellow pigments, green pigments and blue pigments are used as inorganic fillers.

A further advantage of the profile system is that pigments selected from organic pigments such as carbon black, black pigments, yellow pigments, red pigments, green pigments, blue pigments, violet pigments and brown pigments are used as organic fillers. This makes it possible to provide profile systems that are not only economical and cost-effective to produce, but are also sustainable and offer a wide range of options for creatively styling the design, the surface or optical structural effects of such profile systems).

It has also proved to be advantageous in the profile system that pigments selected from the group of perylenes and/or naphthalimides and/or anthraquinones and/or perinones are used as organic fillers. Other pigments that can be used are benzimidazolones, azo pigments, isoindolinones, quinophthalones, pteridines, phthalocyanides and dioxazines. Thanks to these advantageous features, the profile systems can be provided with a design, a surface or with structural effects that are reminiscent of the material glass, for example.

In the profile system, it has also been found to be extremely advantageous that the polymer material of the strip core contains a maximum of 15 wt. %, preferably a maximum of 5 wt. % of fillers, relative to the total weight. On the one hand, this enables economical and cost-effective production and, on the other hand, the design or structural effects in particular can be realised in a sustainable and visually appealing way.

It has also proven to be advantageous for the profile system that the fillers and/or the pigments are contained in the polymer material of the strip core in a spatially uniform, homogeneous and/or inhomogeneous distribution. This leads to a homogeneous, flat and visually appealing structural effect that is distributed over the entire cross-section of the profile system.

It has also proved to be advantageous for the profile system that the front side of the strip core has a decorative coating or a colour application at least in portions. These can be advantageously realised in particular by so-called multicolour printing, by digital printing, by gravure printing and the like. In this advantageous embodiment, the intensity and feel of the surface of the profile system can be further optimised by the material, thickness and form of the decorative coating.

A further advantage of the profile system is that the decorative coating or the colour application on the front side of the strip core has a thickness of approximately 2 to 60 μm, preferably 5 to 30 μm. This leads to an economical and cost-effective production of the profile system as well as to further optimisation possibilities, in particular for the surface or the appearance of the profile system.

Another advantage of the profile system is that the rear side of the strip core has a functional layer at least in portions. In addition to the economical and cost-effective production of the profile system, it is also possible to optimise the fixing of the profile system to an object by varying the functional layer, for example by forming the functional layer as a so-called adhesion promoter layer and/or in which the functional layer is formed as a so-called hot-melt adhesive layer and/or in which the functional layer is formed as a polymer functional layer.

A further advantage of the profile system is that at least one cover layer with a thickness of approximately 2 to 60 μm, preferably 5 to 30 μm, is arranged on the front side of the strip body. It has also been found to be advantageous that the cover layer on the front side of the strip body comprises at least one acrylic polymer and over its thickness has a maximum visible light transmittance of 80% measured according to DIN EN ISO 13468-2:2006-07.

In addition to a visually appealing top side of the profile system, mechanical protection can also be realised, but this does not affect the appearance, in particular the optical structural effect of the profile system.

A further advantage of the profile system is that the polymer material of the strip body has a Shore D hardness of at least 40 in accordance with DIN EN ISO 868:2003-10. On the one hand, this ensures economical and cost-effective production and, on the other hand, it is possible to adapt the polymer material of the strip body to the particular requirements of, for example, the objects, e.g. the pieces of furniture to be edged and the like.

The profile system is further distinguished by the fact that the polymer material of the strip body has a tensile strength of at least 700 MPa according to DIN EN ISO 527:2019-12 and an elongation at break of at least 400% according to DIN EN ISO 527:2019-12. In a further advantageous embodiment of the profile system, it has been shown that the rear side of the strip core of the profile system has been subjected to a surface treatment by a corona process, flame treatment process, plasma process, silicatisation process and the like. This makes it possible to achieve an optimised bond of the profile system for a wide variety of material combinations.

In an equally advantageous embodiment of the profile system, it has been found that the polymer material of the strip body and/or the polymer material of the functional layer contains, embedded therein, light-absorbing and/or radiation-absorbing additives in an amount of 0.01 to 5 wt. %, preferably 0.02 to 3.0 wt. %, relative to the total amount. In this embodiment of the profile system, it can be optimally welded to the narrow sides of pieces of furniture, for example, by means of laser joining processes known per se through the targeted introduction of energy into the polymer material of the functional layer.

It has also proved to be advantageous that the polymer material of the strip body and/or the polymer material of the functional layer contains at least one additive, partly containing inorganic and/or organic pigments, in an amount of approximately 0.01 to 5.0 wt. %, preferably 0.02 to 3.0 wt. %, relative to the total amount. This makes it possible to apply the profile system cost-effectively and economically using all currently known radiation-activatable methods, for example on the narrow sides of pieces of furniture.

A further advantage of the profile system is that the strip body is based on polyvinyl chloride (PVC); polyolefin, such as polypropylene (PP) or polyethylene (PE); a styrene-based polymer, such as polystyrene (PS) or styrene-butadiene copolymer with a predominant styrene content (SB) or acrylonitrile-styrene-acrylic ester copolymers (ASA) or acrylonitrile-butadiene-styrene copolymers (ABS) or styrene-acrylonitrile (SAN); polybutylene terephthalate (PBT); polyethylene terephthalate (PET); polyoxymethylene (POM); polyamide (PA); polymethyl methacrylate (PMMA); polyphenylene oxide (PPO); polyether ether ketone (PEEK); polyphenylene sulphide (PPS); liquid crystal polymer (LCP); polyamide imide (PAI); polyvinylidene fluoride (PVDF); polyphenyl sulfone (PPSU); polyarylether ketone (PAEK); polyacrylonitrile (PAN); polychlorotrifluoroethylene (PCTFE); polyetherketone (PEK); polyimide (PI); polyisobutene (PIB); polyphthalamide (PPA); polypyrrole (PPY); polytetrafluoroethylene (PTFE); polyurethane (PUR); polyvinyl alcohol (PVA); polyvinyl acetate (PVAC); polyvinylidene chloride (PVDC) and mixtures of at least two of these materials.

Furthermore, the profile system is advantageously designed such that the polymer material of the strip body and/or the polymer material of the functional layer contains at least one of the following additives: stabilisers to improve resistance to the effects of light, UV radiation and weathering; stabilisers to improve thermal and thermo-oxidative resistance; stabilisers to improve hydrolytic resistance, stabilisers to improve acidolytic resistance, lubricants, demoulding aids, colouring additives, crystallisation-regulating substances and nucleating agents, flame retardants, impact modifiers, fillers and/or plasticisers. This provides a profile system that can be produced economically and cost-effectively on the one hand, but which also realises the functions known from the prior art, such as adhesive strength values or peel strength values and water resistance, and at the same time has an intensive and long afterglow time.

A further preferred embodiment relates to a profile system according to one of the previous embodiments, wherein the functional layer is based on a thermoplastic material, preferably polypropylene (PP), acrylonitrile-butadiene-styrene copolymer (ABS), polyvinyl chloride (PVC), polymethyl methacrylate (PMMA), polyethylene terephthalate (PET), polyethylene (PE), styrene-ethylene-butadiene-styrene block copolymer (SEBS), polyamide (PA), olefin-based thermoplastic elastomer (TPO), urethane-based thermoplastic elastomer (TPU), thermoplastic copolyester (TPC), styrene block copolymers (SBS, SEBS, SEPS, SEEPS and MBS), thermoplastic copolyamide (TPA) and the like. This measure has the advantage that this material is available at low cost, is easy to process and is also easy to chemically modify.

In a further preferred embodiment, the functional layer is formed as a thermoplastic functional layer, which makes it possible to fix a profile system according to the previously described embodiments without adhesive, i.e. without additionally applying a so-called hot-melt adhesive immediately before joining and without a visible join on a narrow side of a lightweight panel.

A further preferred embodiment relates to a profile system according to one of the preceding embodiments, wherein the material of the functional layer is a copolymer, preferably a graft copolymer, preferably maleic anhydride-grafted polypropylene (PP-MAH). This measure has the advantage that the material composition, in particular the proportion of polar groups in the molecular structure, and thus the material properties can be specifically adjusted.

Furthermore, it has been found to be extremely advantageous that the polymer material of the functional layer is selected from the group of polyurethanes (PUR), acrylates, chloroprenes, epoxy resins, ethylene vinyl acetates (for example EVA dispersions), polyvinyl acetates (PVAC dispersions) and the like, as well as mixtures of two or more of the aforementioned substances.

A further advantage of the profile system is that the material of the functional layer has an adhesion promoter system, preferably as aqueous dispersions or solutions in organic solvents of binder resins, which are selected in particular from the group of polyurethanes, polyesters, acrylates, methyl methacrylates, epoxy resins, ethylene vinyl acetates, polyvinyl acetates, polyvinylidene, polychloroprene, natural rubber, as well as mixtures of two or more of the aforementioned binder groups. Used with or without the addition of crosslinker/activator components, e.g. relative to polyisocyanates, amines or peroxides. The polymer material of the functional layer can be applied to the rear side of the strip body during the direct production of the profile system.

It has also been found to be advantageous that the functional layer of the profile system has a thickness of approximately 0.1 μm to 100 μm, preferably 0.2 μm to 75 μm, particularly preferably 0.5 to 30 μm. Advantageously, in addition to an economical and cost-effective production of the profile system, this means that the functional layer can be optimally adapted to the respective geometry of the profile system.

The problem addressed by of the invention of providing an object is solved by an object having the features of claim 13.

This is an object such as a furniture panel, piece of furniture, door, particle board, worktop and the like comprising at least one profile system which comprises the advantageous embodiments described in the previous paragraphs.

The object is also distinguished by the fact that the profile system has a peel strength of at least 40 N/cm according to DIN 53539:1979-09, measured on particle boards.

The profile system will now be described in greater detail on the basis of these non-limiting exemplary embodiments.

Figure 2:
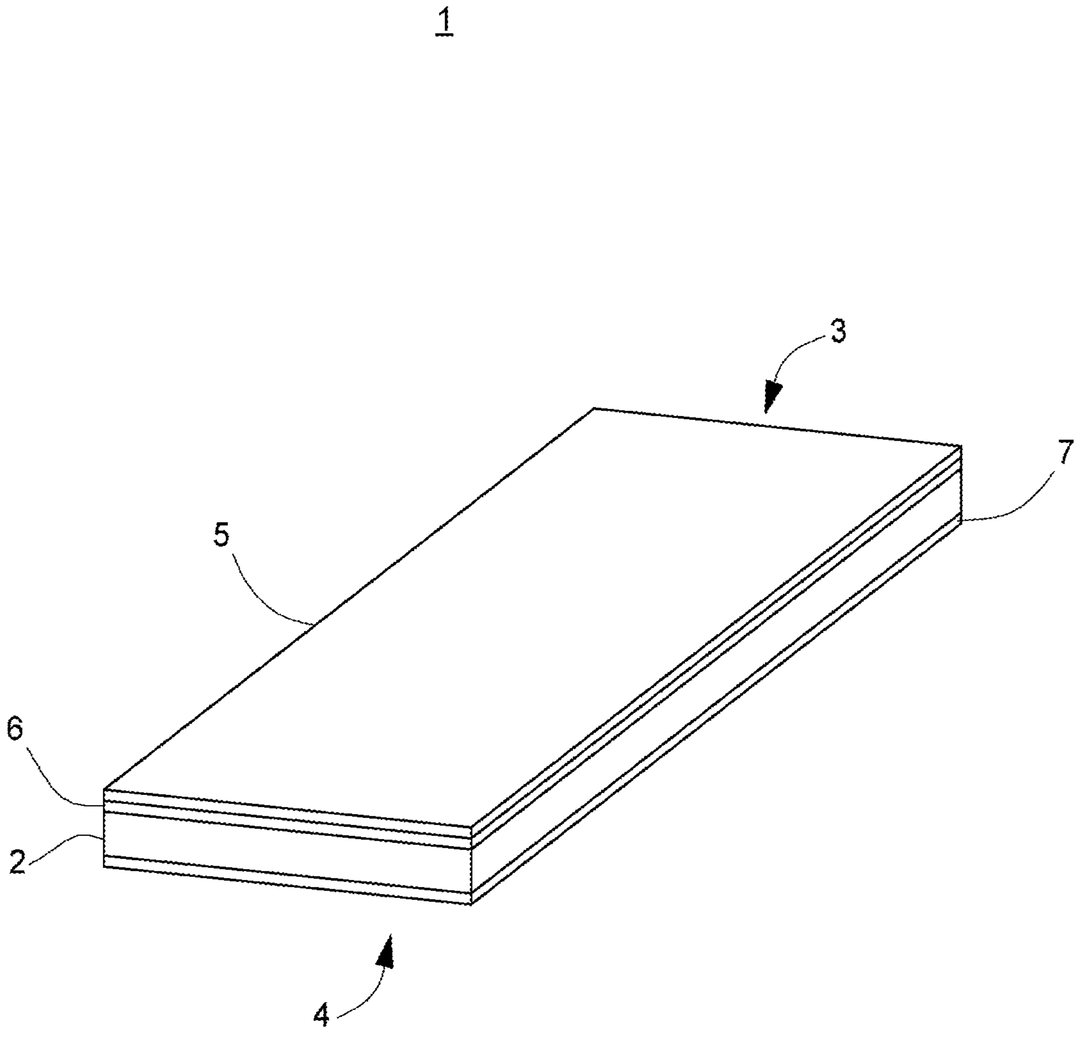

In the figures:

FIG. 1: shows a perspective view of a profile system 1;

FIG. 2: shows a perspective view of a further profile system 1.

FIG. 1 shows a perspective view of a profile system 1.

The profile system 1, in particular an edge strip, with at least one strip core 2 formed from at least one polymer material, wherein the strip core 2 has a front side 3 and a rear side 4 arranged opposite the front side, wherein

- the polymer material of the strip core comprises at least 0.5 to 15 wt. %, preferably 1 to 10 wt. %, particularly preferably 1 to 5 wt. %, relative to the total weight, of fillers comprising cellulose, mica, glitter and mixtures thereof,
- with an average particle size of approximately 100 to 1,600 μm, preferably 120 to 1,000 μm, particularly preferably 150 to 500 μm according to ISO 13320: 2020-0, and
- the polymer material of the strip core comprises at least 0.1 to 10 wt. %, preferably 0.1 to 5 wt. %, particularly preferably 0.1 to 2.5 wt. %, relative to the total weight, of inorganic fillers and/or organic fillers.

In this exemplary embodiment, the polymer material of the strip core 2 comprises about 5 wt. %, relative to the total weight, of fillers comprising cellulose, with an average particle size of about 500 μm according to ISO 13320:2020-0, wherein the polymer material of the strip core 2 has a maximum of about 1.5 wt. %, relative to the total weight, of inorganic fillers and/or organic fillers. Furthermore, the pigments are evenly distributed spatially in the strip core of the profile system 1 in order to achieve a uniform, visually appealing and tactile structural effect of the profile system 1.

FIG. 2 shows a perspective view of a further profile system 1.

The profile system 1, in particular an edge strip, has at least one strip core 2 formed from at least one polymer material, wherein the strip core 2 has a front side 3 and a rear side 4 arranged opposite the front side, wherein

- the polymer material of the strip core comprises at least 0.5 to 15 wt. %, preferably 1 to 10 wt. %, particularly preferably 1 to 5 wt. %, relative to the total weight, of fillers comprising cellulose, mica, glitter and mixtures thereof,
- with an average particle size of approximately 100 to 1,600 μm, preferably 120 to 1,000 μm, particularly preferably 150 to 500 μm according to ISO 13320: 2020-0, and
- the polymer material of the strip core comprises at least 0.1 to 10 wt. %, preferably 0.1 to 5 wt. %, particularly preferably 0.1 to 2.5 wt. %, relative to the total weight, of inorganic fillers and/or organic fillers.

In this exemplary embodiment, the polymer material of the strip core 2 comprises about 4 wt. %, relative to the total weight, of fillers comprising glitter, with an average particle size of about 250 μm according to ISO 13320:2020-0, wherein the polymer material of the strip core 2 comprises a maximum of about 1 wt. %, relative to the total weight, of inorganic fillers and/or organic fillers.

In this exemplary embodiment, the profile system 1 is further formed such that the front side 3 of the strip core 2 has a decorative coating 6 or a colour application at least in portions.

The decorative coating 6 or the paint application on the front side 3 of the strip core 2 of the profile system 1 is substantially monochrome. In this exemplary embodiment, the decorative coating 6 or the colour application on the front side 3 of the strip core 2 of the profile system 1 is in the colour white.

The decorative coating 6 or the colour application on the front 3 of the strip core 2 has a thickness of approximately 2 to 60 μm, preferably 5 to 30 μm. In this exemplary embodiment, the thickness of the decorative coating 6 is approximately 25 μm. The profile system 1 is also formed such that at least one cover layer 5 with a thickness of approximately 2 to 60 μm, preferably 5 to 30 μm, is arranged on the decorative coating 6 or colour application on the front side 3 of the strip body 2. In this exemplary embodiment, the thickness of the cover layer 5 is approximately 10 μm.

The profile system 1 is also formed so that the rear side 4 of the strip core 2 has a functional layer 7 at least in portions.

In this exemplary embodiment, the functional layer 7 of the profile system 1 is formed as an adhesion promoter layer. The polymer material of the functional layer 7 is selected from the group of polyurethanes (PUR).

The profile system 1 is thus extremely versatile and can be applied or attached to a wide variety of objects such as furniture panels, pieces of furniture, particle boards, doors, worktops and the like and, in addition to the function of protecting a narrow side of a furniture panel, for example, can also realise visual or haptic aspects by, for example, the worktops having a profile system 1 which has a visually appealing, haptically perceptible structure effect which has not yet been possible in this form and which significantly improves or optimises the appearance of the entire panel, particularly in the case of a profile system that has been machined/milled on its longitudinal edges.

The invention claimed is:

1. A profile system, has at least one strip core formed from at least one polymer material, wherein the strip core has a front side and a rear side arranged opposite the front side, wherein the polymer material of the strip core comprises 0.5 to 15 wt. %, relative to the total weight, of fillers comprising cellulose, mica, glitter and mixtures thereof, with an average particle size of approximately 100 to 1,600 μm according to ISO 13320:2020-0, and the polymer material of the strip core comprises 0.1 to 10 wt. %, relative to the total weight, of inorganic fillers and/or organic fillers.

2. Profile arrangement according to claim 1, characterised in that the inorganic fillers are in particle form and/or spherulitic and/or fibrous and/or flake form and/or are rod-shaped, selected from C, or Si, or Al, or Ca, or Ti, or Fe, or Zn, or Sn, or mixtures thereof.

3. Profile arrangement according to claim 1, characterised in that the organic fillers are in particle form and/or spherulitic and/or fibrous and/or flake form and/or are rod-shaped, selected from C, or O, or H.

4. Profile arrangement according to claim 1, characterised in that one or more pigments are selected from inorganic pigments comprising titanium dioxide, zinc oxide, iron oxide black, spinel black, red pigments, yellow pigments, green pigments and blue pigments are used as inorganic fillers.

5. Profile arrangement according to claim 1, characterised in that one or more pigments are selected from organic pigments comprising carbon black, black pigments, yellow pigments, red pigments, green pigments, blue pigments, violet pigments and brown pigments are used as organic fillers.

6. Profile arrangement according to claim 1, characterised in that one or more pigments are selected from perylenes, or naphthalimides, or anthraquinones, or perinones and are used as organic fillers.

7. Profile arrangement according to claim 1, characterised in that the fillers and/or one or more pigments are contained in the polymer material of the strip core in a spatially uniform, homogeneous and/or inhomogeneous distribution.

8. Profile arrangement according to claim 1, characterised in that the front side of the strip core has a decorative coating or a colour application at least in portions.

9. Profile arrangement according to claim 8, characterised in that the decorative coating or the colour application on the front side of the strip core has a thickness of approximately 2 to 60 μm.

10. Profile arrangement according to claim 1, characterised in that the rear side of the strip core has a functional layer at least in portions.

11. Profile arrangement according to claim 1, characterised in that at least one cover layer with a thickness of approximately 2 to 60 μm, preferably 5 to 30 μm, is arranged on the front side of the strip body.

12. Profile arrangement according to claim 11, characterised in that the cover layer on the front side of the strip body comprises at least one acrylic polymer and over its thickness has a maximum visible light transmittance of 80% measured according to DIN EN ISO 13468-2:2006-07.

13. Object such as a furniture panel, piece of furniture, particle board, door, worktop and the like comprising at least one profile system according to claim 1.

14. Profile arrangement according to claim 1, wherein the polymer material of the strip core comprises 1 to 10 wt. %, relative to the total weight, of fillers comprising cellulose, mica, glitter and mixtures thereof.

15. Profile arrangement according to claim 1, wherein the polymer material of the strip core comprises 1 to 5 wt. %, relative to the total weight, of fillers comprising cellulose, mica, glitter and mixtures thereof.

16. Profile arrangement according to claim 1, wherein the polymer material has an average particle size of 120 to 1,000 μm according to ISO 13320:2020-0.

17. Profile arrangement according to claim 1, wherein the polymer material has an average particle size of 150 to 500 μm according to ISO 13320:2020-0.

18. Profile arrangement according to claim 1, wherein the polymer material of the strip core comprises 0.1 to 5 wt. %, relative to the total weight, of inorganic fillers and/or organic fillers.

19. Profile arrangement according to claim 1, wherein the polymer material of the strip core comprises 0.1 to 2.5 wt. %, relative to the total weight, of inorganic fillers and/or organic fillers.

* * * * *